(12) United States Patent
Zhmud

(10) Patent No.: US 9,032,597 B2
(45) Date of Patent: May 19, 2015

(54) METHOD FOR PROVIDING A LOW-FRICTION SURFACE

(75) Inventor: Boris Zhmud, Stockholm (SE)

(73) Assignee: Applied Nano Surfaces Sweden AB, Upsala (SE)

( * ) Notice: Subject to any disclaimer, the term of this patent is extended or adjusted under 35 U.S.C. 154(b) by 251 days.

(21) Appl. No.: 13/808,541

(22) PCT Filed: Jul. 16, 2010

(86) PCT No.: PCT/SE2010/050850
§ 371 (c)(1),
(2), (4) Date: Jan. 4, 2013

(87) PCT Pub. No.: WO2012/008890
PCT Pub. Date: Jan. 19, 2012

(65) Prior Publication Data
US 2013/0104357 A1    May 2, 2013

(51) Int. Cl.
*B24B 39/00*    (2006.01)
*B05D 5/08*    (2006.01)
(Continued)

(52) U.S. Cl.
CPC ............... *B05D 5/08* (2013.01); *C10M 125/22* (2013.01); *C10M 169/04* (2013.01); *C10M 2201/043* (2013.01); *C10M 2201/065* (2013.01); *C10M 2203/1006* (2013.01);
(Continued)

(58) Field of Classification Search
CPC ............ B05D 3/08; B24B 1/00; B24B 39/00; C10M 2201/065; C21D 7/08; C22F 1/00
See application file for complete search history.

(56) References Cited

U.S. PATENT DOCUMENTS 1,654,509 A    12/1927    Claus
4,629,547 A    12/1986    Honda et al.
(Continued)

FOREIGN PATENT DOCUMENTS

GB    776502    6/1957
GB    782263    9/1957
(Continued)

OTHER PUBLICATIONS

Jian-Qiang Hu et al; Tribological behaviors and mechanism of sulfur and phosphorus-free organic molybdate ester with zinc dialkyldithiophosphate, ScienceDirect; Tribology International 41 (2008) 549-555.
(Continued)

*Primary Examiner* — Alexander P Taousakis
(74) *Attorney, Agent, or Firm* — Birch, Stewart, Kolasch & Birch, LLP

(57) ABSTRACT

A manufacturing method for providing a low-friction surface comprises providing (210) of a mechanical element. A tool is mechanically rubbed (212) against a surface of the mechanical element. A process liquid is provided (214) to a contact area between the mechanical element and the tool. The process liquid comprises a first element that is a refractory metal and a second element that is a chalcogen. The first and second elements are provided in a liquid substance. The mechanical rubbing is performed with a contact pressure that is between 1% and 100% of an ultimate strength of the mechanical element. The mechanical rubbing thereby causes a combined burnishing of the surface of the mechanical element and a deposition of a tribofilm on the surface of the mechanical element. The tribofilm comprises the first element and the second element.

20 Claims, 4 Drawing Sheets

(51) Int. Cl.
*C10M 125/22* (2006.01)
*C10M 169/04* (2006.01)
*C23C 26/00* (2006.01)
F16C 33/10 (2006.01)

(52) U.S. Cl.
CPC .............. *C10M 2205/0285* (2013.01); *C10M 2207/2805* (2013.01); *C10M 2209/1033* (2013.01); *C10N 2210/06* (2013.01); *C10N 2220/022* (2013.01); *C10N 2220/04* (2013.01); *C10N 2230/06* (2013.01); *C10N 2240/10* (2013.01); *C10N 2270/00* (2013.01); *C23C 26/00* (2013.01); *C10M 2201/05* (2013.01); *C10M 2201/066* (2013.01); *C10N 2240/401* (2013.01); *F16C 33/1095* (2013.01)

(56) References Cited

U.S. PATENT DOCUMENTS

| | | | |
|---|---|---|---|
| 5,363,821 A | 11/1994 | Rao et al. | |
| 5,643,055 A * | 7/1997 | Linzell | 451/36 |
| 8,545,930 B2 * | 10/2013 | Stavlid | 427/11 |
| 2002/0183209 A1 * | 12/2002 | Jee et al. | 508/113 |
| 2005/0214540 A1 | 9/2005 | Maslar | |
| 2008/0234149 A1 | 9/2008 | Malshe et al. | |
| 2009/0311476 A1 * | 12/2009 | Stetina et al. | 428/141 |
| 2010/0255762 A1 * | 10/2010 | Mandel et al. | 451/60 |
| 2014/0165351 A1 * | 6/2014 | Hirano et al. | 29/90.01 |
| 2014/0212587 A1 * | 7/2014 | Malshe | 427/331 |

FOREIGN PATENT DOCUMENTS

| | | |
|---|---|---|
| JP | 2001-214800 A | 8/2001 |
| JP | 2004-076914 A | 3/2004 |
| JP | 2004 76914 A | 3/2004 |
| JP | 2004-76914 A | 3/2004 |
| JP | 2007-99947 A | 4/2007 |
| JP | 2009-079138 A | 6/2009 |
| WO | WO 96/20083 A1 | 7/1996 |
| WO | WO 03/091479 A1 | 11/2003 |
| WO | WO 2009/071674 A2 | 6/2009 |

OTHER PUBLICATIONS

David Stephenson: "Metal Cutting Theory and Practice, Roller Burnishing" In: "Metal Cutting Theory and Practice,", Jan. 1, 2006, CRC Taylor & Francis, Boca Raton, FL, XP055160040, pp. 52-54.

* cited by examiner

METHOD FOR PROVIDING A LOW-FRICTION SURFACE

TECHNICAL FIELD

The present invention relates in general to provision of low-friction surfaces and in particular to provision of tribochemically deposited low-friction surfaces.

BACKGROUND

Friction between surfaces is one of the largest causes for energy losses in mechanical appliances such as internal combustion engines and various machines and mechanisms. Friction also leads to wear which limits service lifetime of said appliances. Therefore, in many applications, there is a general request to provide surfaces having as low friction and experiencing as little wear as possible in contact with other surfaces. The most traditional way to reduce friction is by using lubricants. The lubricants keep the surfaces apart and are in themselves easily shearable, which reduces the force needed to achieve a relative motion. Liquid lubricants, such as oils are still the most used type of lubricants.

The utility of certain solid film lubricants has been known for quite some time. Here below are just a few examples presented. The U.S. Pat. No. 1,654,509 describes the use of graphite embedded into a metal binder to make an antiwear coating for bearings. The published patent application GB776502A describes protective films formed by treatment with vaporized reactive substances containing phosphorus, sulfur, selenium or halogen atoms. These protective films serve at least two functions advantageous to effective lubrication: (i) they provide a load-carrying film of solid lubricant; and (ii) they minimize carbonization and varnishing by inhibiting the catalytic activity of the metal. GB782263 shows that sulfurization of ferrous metal parts by heating the parts to a temperature above 500° C. in a fused salt bath containing alkali metal cyanide, alkali metal cyanate and active sulfur improves their resistance to wear and seizure. The published international patent application WO03091479A describes chemical treatment for piston rings and piston by heating in oil containing appropriate additives. The U.S. Pat. No. 5,363,821 discloses use of graphite, $MoS_2$, BN solid lubricants incorporated into a polymeric carrier/binder for making antifriction coatings at the cylinder bore walls by spray-application with subsequent thermal fixation.

Still one method for production of a low friction coating is disclosed in the published Japanese patent application 2004-76914. A sliding member moves relative to a sliding surface and a lubricating oil containing molybdenum and sulfur is supplied to the sliding surface. Steel powder is added to a polyamideimide resin and by pressing the polyamideimide resin against the surface in the presence of said lubricating oil, molybdenum and sulfur are forced to react on the iron surface, yielding molybdenum disulfide held in a matrix of the resin. The resin thereby acts as a binder of the created molybdenum disulfide.

One could also mention a group of prior art techniques describing low-friction films produced by PVD, CVD and/or plasma-sputtering. Thus, the published US patent application 2005/0214540 describes PVD/CVD coatings for pistons, and the U.S. Pat. No. 4,629,547 describes low-friction boron-containing films obtained by plasma sputtering.

Common for most solid lubricant systems is that the lubricant is deposited onto the surface either as a pure lubricant substance or as a lubricant in a bearer substance. The deposition can be followed by different kinds of post treatments, typically thermal treatments or mechanical treatments. The lubricants will thus be provided as a layer on top of the surface to be lubricated. It is difficult to obtain a good adherence to the surface at the same time as a low friction is to be shown to a neighboring surface.

Advantages of tribofilms in reducing friction and wear are well known in the field of tribology. Tribochemical deposition of solid lubricants has advantageously been used in the published international patent application WO2009/071674, which discloses how to produce a tribochemically deposited film by mechanically rubbing a tool, typically comprising Mo or W, against a surface to be covered in the presence of sulfur. Such tribochemically deposited films present very attractive properties concerning smoothness, wear resistance and low friction. One important note is that the tribochemical process involves the substrate material as well, causing a gradual transformation between the substrate material and the solid lubricant. $WS_2$ and $MoS_2$ tribofilms allow increasing the lubricant film strength, and as a result, the wear resistance is increased. Furthermore, the surface integrity is improved and fatigue wear during and after running-in is reduced. The films also have a low boundary friction. The tribofilms also have a low boundary friction.

A minor drawback with the method presented in WO2009/071674 is that the tool surface, typically being made of an alloy comprising Mo and/or W, is consumed in the process and must be replaced at intervals. Furthermore, the tribofilm deposition rate is limited by relatively slow heterogeneous reaction between solid metal and active sulfur.

SUMMARY

An object of the present invention is to provide more production-efficient methods for producing tribochemically deposited solid lubricant coatings.

The above object is achieved according to the enclosed independent claim. Preferred embodiments are presented in the dependent claims. In general words, a triboconditioning method comprises providing of a mechanical element. A tool is mechanically rubbed against a surface of the mechanical element. A process liquid is provided to a contact area between the mechanical element and the tool. The process liquid comprises a first element that is a refractory metal element and a second element that is a chalcogen element. The first element and the second element are provided in a liquid substance. The mechanical rubbing is performed with a contact pressure that is between 1% and 100% of an ultimate strength of the mechanical element. The mechanical rubbing thereby causes a combined burnishing of the surface of the mechanical element and a deposition of a tribofilm on the surface of the mechanical element. The tribofilm comprises the first element and the second element.

One advantage with the present invention is that a tribofilm of a solid lubricant can be manufactured with a lower tool wear and with better control over process parameters than with prior art methods. Other advantages are discussed in connection with the detailed descriptions further below.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the present disclosures, equal or directly corresponding features in different figures and embodiments will be denoted by the same reference numbers.

As indicated in the background, tribofilms of solid lubricants present extraordinary properties mainly concerning the allowed contact pressure, antiwear properties, as well as morphology. In order to understand the importance of the structure of a tribofilm, a brief introduction in tribofilm properties is therefore first given.

Figure 1A:
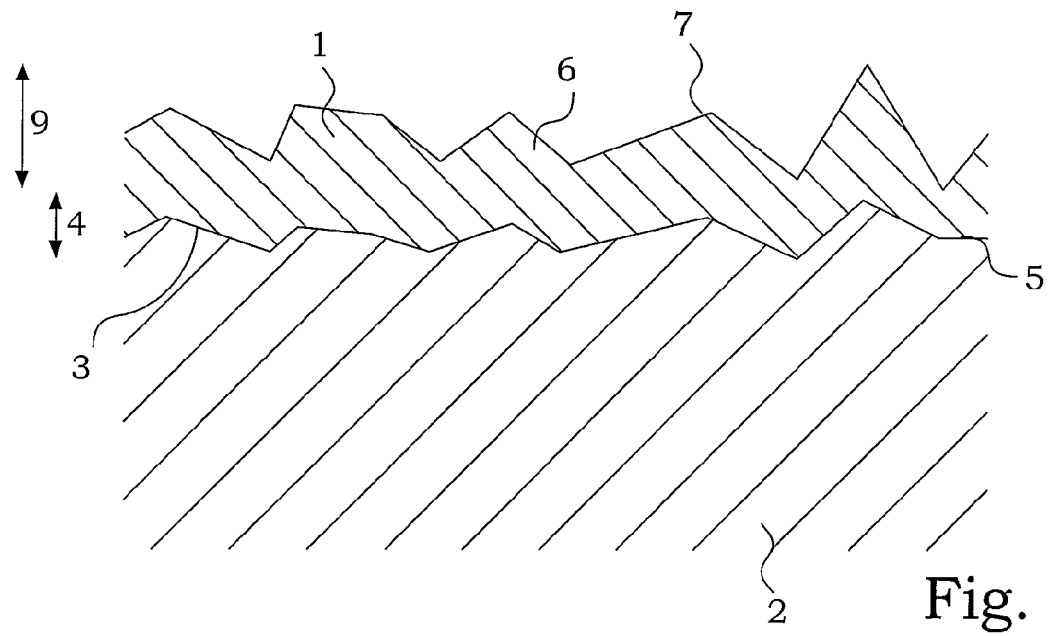
FIG. 1A-B are schematic illustrations of solid lubricant depositions.

When depositing a solid lubricant onto a surface according to non-tribochemical methods, the end product could look like the one schematically illustrated in FIG. 1A. A substrate 2, having a certain roughness 4 of its surface 3, is covered by a layer 6 of solid lubricant 1. If the deposition was made by only the solid lubricant 1 or if any additional elements were removed in a post-deposition process, such as a thermal treatment or a mechanical treatment, the entire layer 6 typically consists of the solid lubricant 1. There is an interface 5 between the substrate 2 phase and the solid lubricant 1 phase that is more or less sharp. The wear and pressure properties of the covered surface will to a large extent depend on the properties of this interface 5. In order to avoid flaking-off, the bonds over the interface 5 have to be strong. At the same time, the solid lubricant 1 itself should typically be easily shearable. The surface 7 of the layer 6 of solid lubricant 1 will depend on the deposition method used. However, typically, the roughness 9 of the surface 7 is larger than the roughness 4 of the surface 3 of the substrate 2. If a smoother surface is required post-treatment, such as lapping or polishing, may be necessary.

Figure 1B:
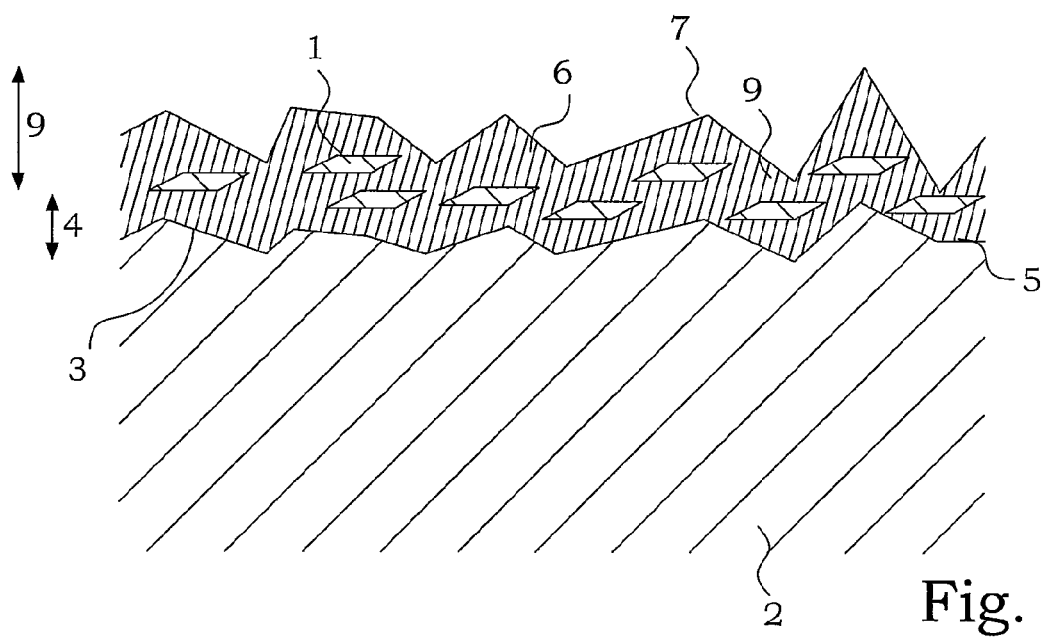

FIG. 1B illustrates a situation, where a layer 6, having solid lubricant 1 domains embedded in a carrier matrix material 9, is deposited onto the substrate surface. In such a case, the carrier matrix material 9 can be adapted in order to give strong bonds to the substrate 2. However, the overall amount of solid lubricant available at the layer surface 7 is lower, and the friction properties are thereby probably not as good as in FIG. 1A.

Figure 1C:
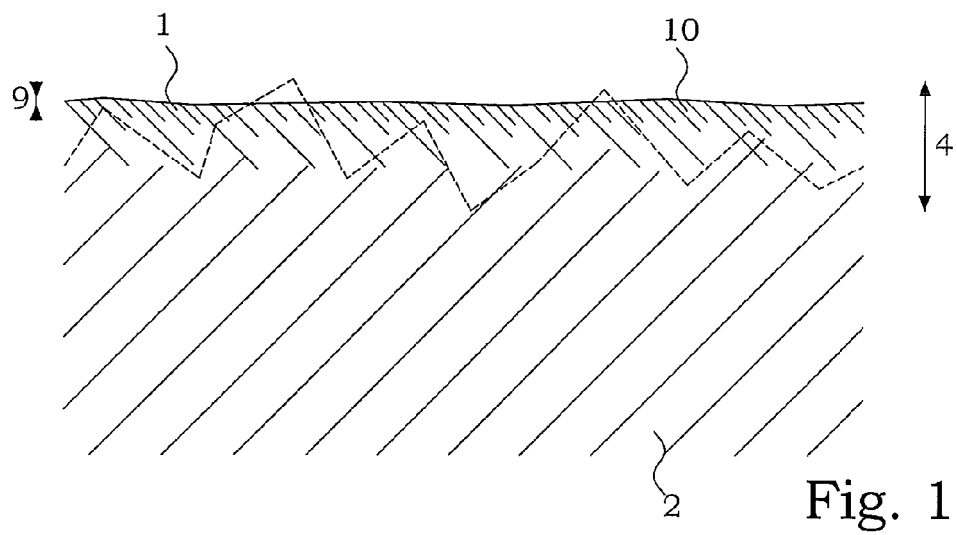
FIG. 1C is a schematic illustration of a tribofilm of solid lubricant.

FIG. 1C illustrates a deposition of a tribofilm 10. During tribochemical deposition under favorable conditions, which will be discussed further below, a deposition of a tribofilm 10 will be combined with a burnishing of the original surface 3, here indicated by a dotted line. The burnishing is effected through the mechanical contact between the tool and the workpiece, whereby asperities are leveled out or polished away. At the same time, such abraded material is coming into contact and react with the substances that are intended for the formation of the tribochemically deposited film. The tribochemically deposited film—or tribofilm—is thereby formed by chemical reactions between the surface to be covered, the abraded material and the substances of the process liquid and possibly also the working tool, providing the local heat and pressure that enables the reactions. Together, all these substances form a tribofilm 10 of solid lubricant 1. However, the tribofilm 10 will not be a homogeneous film. The tribofilm 10 will instead have a changing composition from a pure substrate substance to almost a pure solid lubricant substance. The thickness and distribution of the solid lubricant substance will also vary laterally over the surface, depending on e.g. the original surface topology.

In the present disclosure, a tribofilm is defined as a protective layer that is generated during sliding or rolling in a frictional contact between two surfaces in the presence of special additives which undergo tribochemical reactions resulting in the formation of a new chemical compound at the rubbing surfaces. The tribofilm thus formed prevents direct metal-to-metal contact and associated cold welding phenomena. The tribofilms produced according to the present invention present a direct bonding of the tribochemically produced compounds of solid lubricants to the covered surface.

This direct bonding provides an excellent scratch resistance, impact resistance and thermal resistance. In contrast to e.g. the Japanese patent application 2004-76914, no metallic powder is used in the production process, and no organic binder is needed for the retention of the solid lubricant at the surface, in the present invention.

One of the basic ideas of the present invention is to provide a process liquid containing all active substances for the tribochemical reaction. Previous tribochemical depositions have been performed with one component in the working tool and the other in the process liquid. However, the working tool is thereby successively worn, which leads to uncontrollable changes in tool/workpiece contact geometry and requires that the working tool to be regularly exchanged for a new or reconditioned one. In a test series with a working tool comprising metallic tungsten, a process liquid comprising sulfur as well as a soluble tungsten compound was provided during the operation. It was found that the wear of the working tool was reduced compared with a process using a process liquid comprising only sulfur. It could therefore be concluded that at least a part of the tungsten that was incorporated in the solid lubricant was sourced directly from the process liquid. With an excess of tungsten compounds in the process liquid, the wear of the tool could be reduced considerably. Therefore, using a process liquid comprising both tungsten and sulfur is considered as a preferred solution.

As a consequence of this, it is also possible to run the tribochemical deposition with an inert working tool without any tungsten content at all provided that the amount of tungsten in the process liquid is large enough to ensure acceptable film formation rate/processing time.

Another very important parameter is the pressure. In order to achieve a true tribofilm, the working of the surface to be covered has to involve significant burnishing components as well. Burnishing requires the localized asperity-asperity contact pressure in excess of the yield stress of the workpiece material. Burnishing is essential not only for improving surface smoothness but also for unveiling fresh metal surface to reactants to enable chemical bonding. The combined burnishing of the surface to be covered and the tribogeneration and deposition of the solid lubricant will result in a true tribofilm. It was found that the pressure needed for achieving such a tribofilm depends on the mechanical properties of the surface to be covered. Typically, a contact pressure corresponding to at least 1% of an ultimate strength of the covered element is needed to produce a tribofilm. Of course, the contact pressure could not exceed 100% of the ultimate strength, since the element to be covered then would be damaged. For elements to be covered made of ductile materials, the yield stress is also a parameter of importance. The yield stress is typically just somewhat lower than the ultimate strength and the contact pressure should not then exceed 100% of the yield stress. For materials having both an ultimate strength and a yield stress, both these values are in most cases in the same order of magnitude.

For an element to be covered made of a typical cast iron, the contact pressure would therefore be at least 50-100 MPa. For an element to be covered made of a typical high speed steel, the contact pressure would instead be at least 100-200 MPa. These numbers are only serving as typical examples and the appropriate contact pressures have to be determined for each individual element separately.

Another feature that had been discovered was that the speed of deposition of the tribofilm was highly dependent on the contact pressure. The general trend was that a higher contact pressure resulted in a higher deposition rate. At a contact pressure of 5% of an ultimate strength of the covered element, the deposition rate was significantly raised, and at a contact pressure of 10% of an ultimate strength of the covered element the deposition rate increased even more. This is explained by expansion of the load-bearing surface area at which triboreactions occur. As discussed above, for ductile material, such as grey cast iron, yield stress can be used in place of ultimate strength, giving approximately the same general picture of the behavior.

Figure 2:
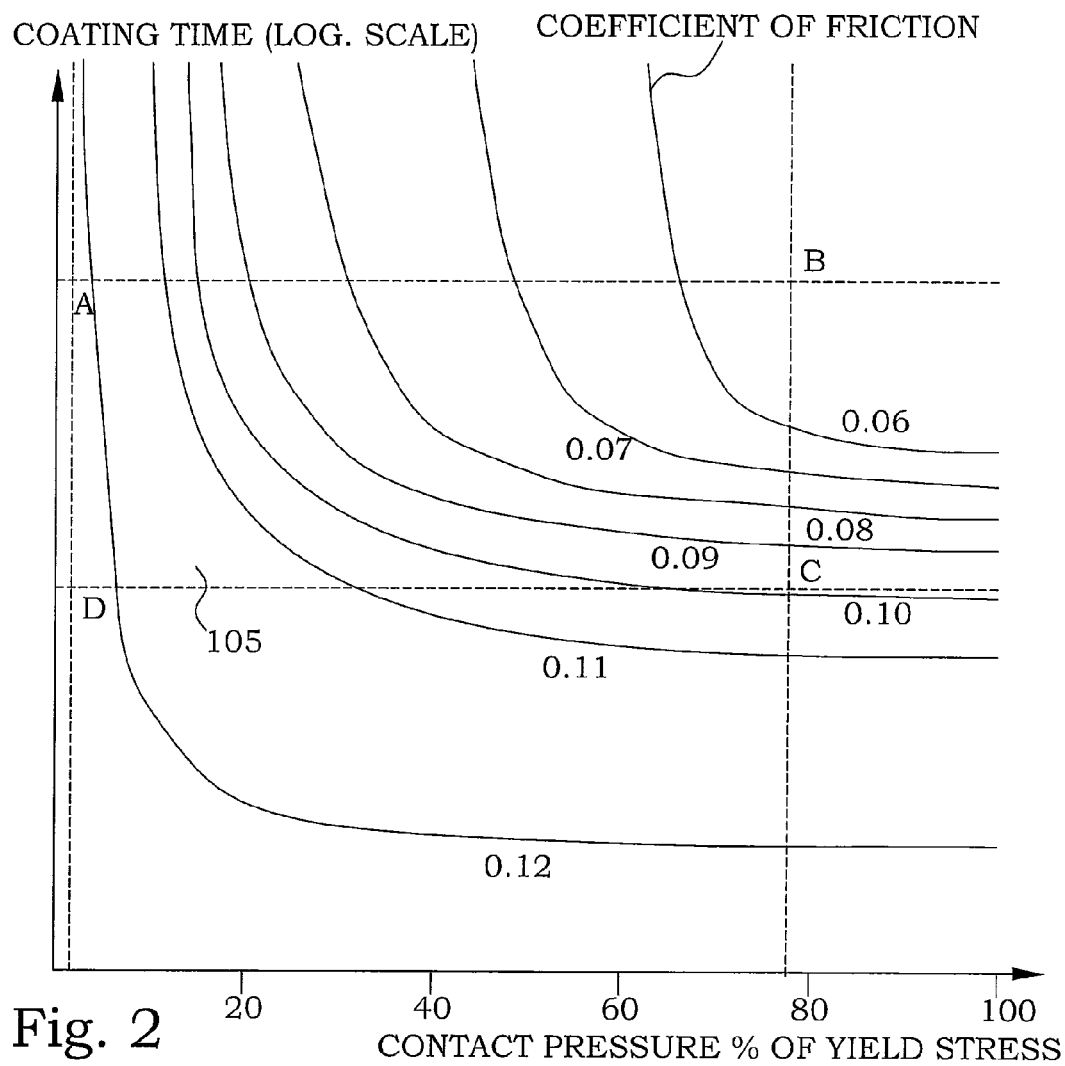
FIG. 2 is a diagram illustrating an example of a relationship between coating time and contact pressure between the tool and the workpiece.

FIG. 2 illustrates basic considerations based on which the runnability window 105, ABCD, for a specific workpiece/tool combination is determined. If the contact pressure is too low, typically below 1% of the yield stress of the workpiece material (or relative the ultimate strength of a non-ductile material), the tribofilm formation rate becomes too low and the process efficiency becomes unsatisfactory. This defines the left runnability borderline AD. On the other hand, if the contact pressure is too high, approaching the yield stress of the workpiece material, the risk of workpiece damage increases rapidly. This defines the right runnability borderline BC. Further, if the processing time is too short, it is impossible to generate enough reaction products and to achieve an adequate degree of surface burnishing. This defines the lower runnability borderline DC. Finally, if the processing time is too long, it is impossible to achieve adequate process output and overall process efficiency will decline. For typical elements to be covered, the preferred contact pressures are over 10 MPa, more preferably over 50 MPa, even more preferably over 100 MPa and most preferably over 200 MPa, as long as the ultimate strength is not exceeded. As a comparison, contact pressures that are used e.g. for running-in or honing are typically in the range of 1 to 10 MPa.

Since the process disclosed herein includes both elements of coating and running-in, it will alternatively be referred to as "triboconditioning".

Figure 3:
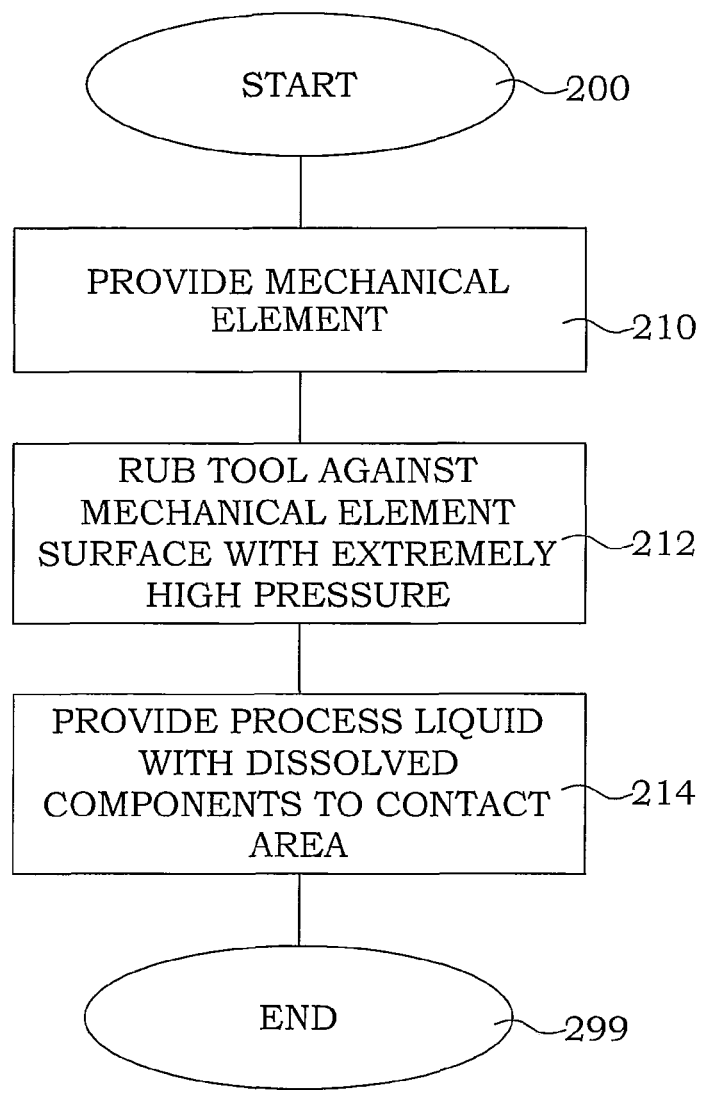
FIG. 3 is a flow diagram of steps of an embodiment of a method according to the present invention.

FIG. 3 illustrates a flow diagram of steps of an embodiment of a triboconditioning method according to the present invention. The triboconditioning method starts in step 200. A mechanical element to be covered is provided in step 210. In step 212, a tool is mechanically rubbed against a surface of the mechanical element with an sufficiently high pressure. The mechanically rubbing is performed with a contact pressure between 1% and 100% of an ultimate strength of the mechanical element. A process liquid is in step 214 provided to a contact area between the mechanical element and the tool. The process liquid comprises a first element, which is a refractory metal element and a second element, which is a chalcogen element. The first element and the second element are provided in a liquid substance. The active elements can be provided in a common active component or in separate active components in the liquid substance. The mechanical rubbing thereby causes a combined burnishing of the surface of the mechanical element and a deposition of a tribofilm. The so-produced tribofilm comprises the first element and the second element on the surface of the mechanical element. The process ends in step 299.

Two of the solid lubricants most used in prior art are $WS_2$ and $MoS_2$. Tungsten disulfide (molar weight 248 g/mole, density 7.5 g/cm$^3$ and decomposition temperature of 1250° C.) is produced by reaction of a sulfur compound with a tungsten source according to:

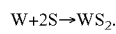

Similarly, molybdenum disulfide (molar weight 160 g/mole, density 5.0 g/cm$^3$, melting point 2375° C. and sublimation point 450° C.) is formed by reaction of a sulfur compound with a molybdenum source according to:

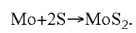

The said disulfides can also be produced by triboconversion of certain sulfur-containing metallocomplexes, including but not limited to thiocarbamates, thiophosphates, thioxanthates and similar chemistries.

Besides these two well-known solid lubricants, there are also other possibilities and a number of test with different process fluid compositions have been performed.

Depending on the reactivity of the substrate with the sulfur containing process liquid, certain amounts of metal sulfides other than $WS_2$ and $MoS_2$ will be produced by the tribodeposition process. Thus the actual composition of the film will depend on the substrate type and the process liquid composition. For steel, the tribofilm is believed to consist largely of tungsten sulfides or molybdenum sulfides, respectively, and iron sulfides. Under certain conditions, mixed oxides, such as tungsten bronzes, can be formed as well. It should be noted, however, that, as a rule of thumb, the tribofilms have no well-defined stoichiometric formula.

The metal component of the solid lubricant is preferably selected as a refractory metal in general. As indicated above, the most prominent candidates are Mo and W. These refractory metals are provided as metal compounds dissolved in the process liquid and possibly also as metal or metal compounds in the working tool. The metal compounds dissolved in the process liquid are preferably salts or organocomplexes. Non-exclusive examples of tungsten compounds that are usable for these purposes are:
simple tungstates,
thiotungstates,
tungsten dithiocarbamates,
tungsten dithiophosphates,
tungsten carboxylates and dithiocarboxylates,
tungsten xanthates and thioxanthates, polynuclear tungsten complexes containing carbonyl, cyclopentadienyl and sulfur as ligands,
halogen containing complexes of tungsten with pyridine, bipyridine, nitriles and phosphines as ligands,
adducts of tunstic acid with fatty glycerides, amides and amines.

Non-exclusive examples of molybdenum compounds that are usable for these purposes are:
simple molybdates,
thiomolybdates,
molybdenum dithiocarbamates,
molybdenum dithiophosphates,
molybdenum carboxylates and dithiocarboxylates,
molybdenum xanthates and thioxanthates,
polynuclear molybdenum complexes containing carbonyl, cyclopentadienyl and sulfur as ligands, halogen containing complexes of molybdenum with pyridine, bipyridine, nitriles and phosphines, adducts of molybdic acid with fatty glycerides, amides and amines.

Also the non-metal component of the solid lubricant can be selected in different ways. Candidates for be included in solid lubricants can be found among general chalcogens, of which sulfur presently is believed to be the main choice. Sulfur can enter the tribochemical reaction in the form of elementary sulfur or sulfur derivatives dissolved in the process liquid. The most useful sulfur derivatives are the ones often referred to as active sulfur and comprises e.g. the groups of organic sulfides and organic polysulfides. Non-exclusive examples of such active sulfur are dibensyldisulfide, sulfurized isobutene, sulfurized fatty acids and dialkylpolysulfides. Alternatively, sulfur can enter the tribochemical reaction together with the refractory metal component such as thiocarbamate, thiophosphate, or thioxanthate, in which case no secondary source of sulfur is need.

Also the solvent used in the process liquid presents a variety of possibility. Suitable candidates are low-volatile high-flash solvents such as mineral oils, polyalphaolefins, esters, polyethylene glycol and ionic liquids. The solvent used in the process liquid is generally not intended to be a part of the final product.

In one embodiment, the process liquid thereby comprises at least three components; a liquid substance typically acting as a solvent and a first and a second active component. The first active component comprises a first element, which is a refractory metal element. The second active component comprises a second element, which is a chalcogen element. The first active component and the second active component are provided in the liquid substance.

In another embodiment, the process liquid thereby comprises at least two components; a liquid substance typically acting as a solvent and an active component. The active component comprises both a first element, which is a refractory metal element, and a second element, which is a chalcogen element. The active component is provided in the liquid substance.

As already mentioned, the working tool does not have to comprise any component for the tribofilm. A major function of such a passive tool is to trigger triboreactions on the workpiece surface in the presence of the process liquid. The passive tool is not consumed apart from normal wear. Examples of passive tools are high speed steel (HSS), tungsten carbide (WC), boron nitride (BN), diamond-like carbon (DLC) coated tools, various ceramics and metal-ceramics, etc.

In another embodiment, the tool comprises the first active component. Such an active tool has a double function. It provides at least a part of one reactive component, which eventually forms the tribofilm. It also has the function to trigger triboreactions between the workpiece surface and the process liquid. An active tool thereby combines functions of triggering desired triboreactions and feeding them with reactants needed for the tribofilm generation. Examples of active tools used in the present invention are metallic or sintered metallic tools containing tungsten or molybdenum.

Both active and passive tools may incorporate a system of channels for reagent transport to the friction contact where the actual triboreactions occur. At least a part of the process liquid can thereby be supplied through the tool itself.

When initiating a deposition of a tribofilm, there is typically an extremely high friction between the tool and the workpiece surface. There is a risk for the tool to get stuck causing scoring, galling or other damage to the workpiece surface. In order to address this issue, in one embodiment of the invention, the process liquid further comprises one or more runnability agents dissolved therein. These runnability agents can typically be extreme pressure additives, antiwear additives or friction modifiers, antioxidants, corrosion inhibitors, and antifoams. Unlike the refractory metal and chalcogen components, whose primary function is to generate the tribocoating, the primary function of runnability agents is to guarantee smooth process running for a specific substrate/tool combination by:

stabilizing the process liquid against oxidation;
maintaining surface cleanliness;
preventing workpiece and tool corrosion;
controlling foam formation.

Non-exclusive examples of such runnability agents are zinc dialkyl dithiophosphate (ZnDDP), tricresylphosphate (TCP), phosphate esters, borate esters, ionized vegetable oils, fatty amides and fatty esters.

In order to further illustrate the present invention, two particular examples will be presented here below.

Example 1

A tool comprising metallic tungsten was used to produce a tungsten disulfide tribocoating on the surface of a camshaft for an automotive internal combustion engine. The camshaft in study was made of chilled cast iron, 470 HV hardness. The contact pressure between the tool and the camshaft was in the range of 100 to 200 MPa. The process liquid contained 3 wt. % tungsten and 1 wt. % active sulfur dissolved in a hydrocarbon solvent with a kinematic viscosity of 2 cSt at 100 C. The triboconditioning of the camshaft was run for 10 min at 100 rpm. The tribological properties of the coated camshaft were compared to those of the original one. The experimental conditions were as follows: 10 measurements were taken for each coating: three repetitive measurement of the coefficient of friction for three different rotation speeds (corresponding to the sliding speeds from 0.1 to 0.7 m/s), concluded by one wear test. As the friction probe, a roller from a bearing steel was used. The roller radius was 5.5 mm and the shaft node radius was 18 mm. Each friction test was run for 10 min at 5N load using Castrol SLX 5W-30 engine oil as lubricant. The wear test was run for 1 hour at the same load. Wear mark was analyzed using optical microscopy.

These experiments demonstrated improved tribological performance of coated camshafts: the coefficient of friction is reduced by 20 to 60%, see Table 1. Simultaneously, wear reduced by 4 to 10 times. It can from the table easily be seen that the coated camshafts presented a significantly lower coefficient of friction compared to an untreated camshaft under corresponding conditions. (Note that the coefficient of friction is a speed-dependent property.)

TABLE 1

Effect of WS2 tribocoating on friction between cam and follower.

| Camshaft | Coefficient of friction, for cam/follower sliding speed of | | |
|---|---|---|---|
| Tested | 0.1 m/s | 0.25 m/s | 0.7 m/s |
| Original | 0.11 ± 0.01 | 0.09 ± 0.01 | 0.07 ± 0.01 |
| Coated | 0.07 ± 0.01 | 0.06 ± 0.01 | 0.03 ± 0.01 |

Example 2

A tool comprising metallic tungsten was used to produce a tungsten disulfide tribocoating on the surface of a cylinder liner for an automotive internal combustion engine. The liner in study was made of grey cast iron, 450 HV hardness. The contact pressure between the tool and the liner was in the range of 50 to 100 MPa. The process liquid contained 3 wt. % tungsten and 1 wt. % active sulfur dissolved in a hydrocarbon solvent with a kinematic viscosity of 2 cSt at 100 C.

The tribological properties of the coated liner were compared to those of the original one. The experimental conditions were as follows: a reciprocating friction rig was used to measure friction between a cylinder liner segment and a piston ring. The oscillation frequency was 5 Hz, the normal stress was 3 MPa, stroke length was 5 mm, and Castrol SLX 5W-30 engine oil was used as lubricant.

Figure 4:
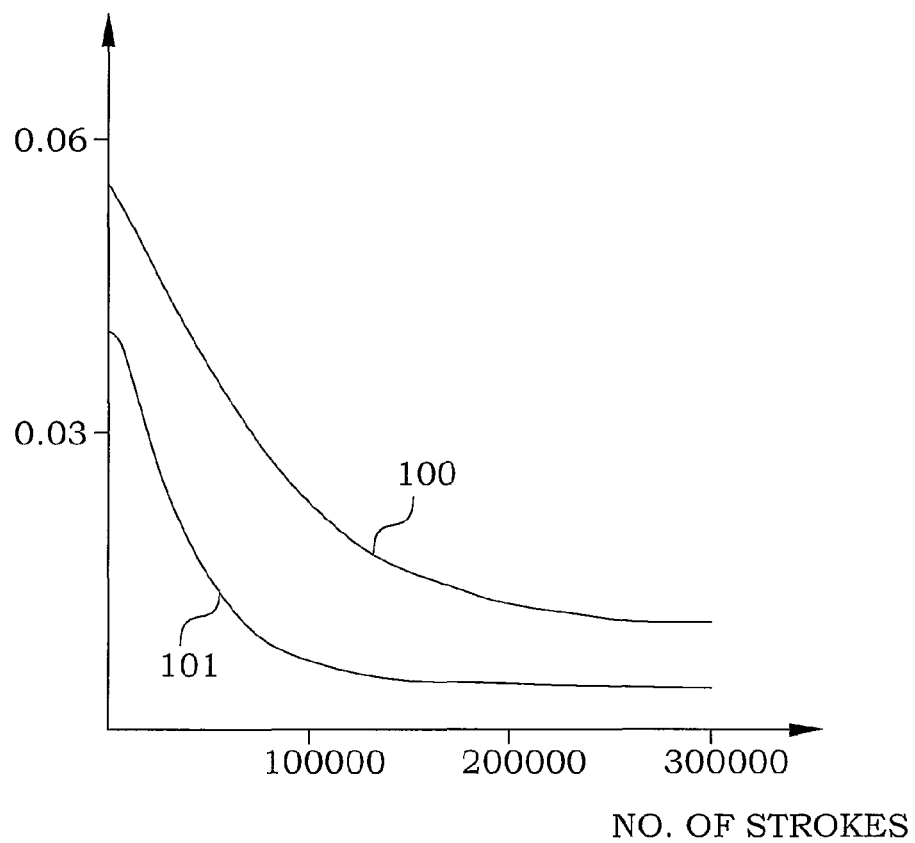
FIG. 4 is a graph illustrating the effect of a solid lubricant tribofilm produced according to the present invention on friction.

These experiments demonstrated significant reduction in friction for coated liners, see FIG. 4. For both the coated 101 and original 100 liner surfaces, the coefficient of friction decreased with time, corresponding to a running-in procedure. However, the triboconditioned liner surface always presented a lower coefficient of friction. Furthermore, the coefficient of friction for the triboconditioned liner surface leveled out at a level significantly lower than the original liner surface, which indicates that even after extensive mechanical contacts, a coating of solid lubricant remains.

The present invention thus discloses a method for improving the tribological properties of metal surfaces. A specific emphasis is made on reduction in friction and wear for metal parts made of ferrous materials and alloys such as cast iron, case hardened steel, carbinitrided steel, high speed steel, etc. achieved by triboconditioning those parts by rubbing a tool against the workpiece in the presence of a process liquid containing components for forming a solid lubricant substance. The method is well suited for treatment of parts such as valvetrain components in internal combustion engines, cylinder liners, shafts, gears, hubs, bearings, slideway rails, and other mechanical components exposed to severe tribological stress. The method disclosed herein combines surface burnishing with deposition of a thin low-friction tribofilm, the chemistry of which differs from the underlying material and features elements of the aforesaid chemical components. In the present invention, the burnishing is effected in a usual way—through mechanical contact between the tool and the workpiece, whereby surface asperities are leveled out or polished away—and the concomitant film deposition is effected through tribochemical reactions at the workpiece surface. The tribochemical reactions are initiated by a combination of temperature and pressure in the contact zone between the tool and the workpiece surface.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. Manufacturing method of surfaces with enhanced tribological properties, comprising the steps of:
   providing a mechanical element;
   mechanically rubbing a tool against a surface of said mechanical element; and
   providing a process liquid to a contact area between said mechanical element and said tool;
   said process liquid comprises a first element provided in a liquid substance;
   said first element being a chalcogen element;
   said mechanically rubbing being performed with a contact pressure between 1% and 100% of an ultimate strength of said mechanical element;
   said process liquid further comprises a second element provided in said liquid substance;
   said second element being a refractory metal element;
   said mechanical rubbing thereby causing a combined burnishing of said surface of said mechanical element and a deposition of a tribofilm, comprising said first element, said second element and material from said mechanical element, on said surface of said mechanical element.

2. Manufacturing method according to claim 1, wherein said liquid substance comprises a first active component comprising said first element and a second active component comprising said second element.

3. Manufacturing method according to claim 1, wherein said liquid substance comprises an active component comprising said first element and said second element.

4. Manufacturing method according to claim 1, wherein said second element is selected as at least one of W and Mo.

5. Manufacturing method according to claim 4, wherein said second element is W.

6. Manufacturing method according to claim 4, wherein said second element is Mo.

7. Manufacturing method according to claim 1, wherein said first element is S.

8. Manufacturing method according to claim 7, wherein said first active component is selected from:
   elementary sulfur; and
   active sulfur.

9. Manufacturing method according to claim 1, wherein said contact pressure exceeds 10% of said ultimate strength of said mechanical element.

10. Manufacturing method according to claim 1, wherein said tool comprises said second active component.

11. Manufacturing method according to claim 1, wherein said process liquid further comprises one or more runnability agents.

12. Manufacturing method according to claim 1, wherein said liquid substance comprises a solvent from the group of mineral oils, polyalphaolefins, esters, polyethylene glycols and ionic liquids.

13. Manufacturing method according to claim 1, wherein said mechanically rubbing being performed with a contact pressure exceeding 50 MPa, preferably exceeding 100 MPa and most preferably exceeding 200 MPa.

14. Manufacturing method according to claim 2, wherein said second element is selected as at least one of W and Mo.

15. Manufacturing method according to claim 3, wherein said second element is selected as at least one of W and Mo.

16. Manufacturing method according to claim 14, wherein said second element is W.

17. Manufacturing method according to claim 14, wherein said second element is Mo.

18. Manufacturing method according to claim 15, wherein said second element is W.

19. Manufacturing method according to claim 15, wherein said second element is Mo.

20. Manufacturing method according to claim 2, wherein said first element is S.

* * * * *